(12) United States Patent
Kim (10) Patent No.: US 9,160,676 B2
(45) Date of Patent: Oct. 13, 2015

(54) APPARATUS AND METHOD FOR MULTI-HOP ROUTING DECISION AND LOOPING PREVENTION

(71) Applicant: Electronics and Telecommunications Research Institute, Daejeon (KR)

(72) Inventor: Bong Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 204 days.

(21) Appl. No.: 13/921,777

(22) Filed: Jun. 19, 2013

(65) Prior Publication Data

US 2014/0003344 A1 Jan. 2, 2014

(30) Foreign Application Priority Data

Jun. 27, 2012 (KR) .................. 10-2012-0068843

(51) Int. Cl.
*H04L 12/801* (2013.01)
*H04W 40/00* (2009.01)
*H04L 12/705* (2013.01)

(52) U.S. Cl.
CPC ............... *H04L 47/34* (2013.01); *H04L 45/18* (2013.01); *H04W 40/00* (2013.01)

(58) Field of Classification Search
None
See application file for complete search history.

(56) References Cited

U.S. PATENT DOCUMENTS

| | | | |
|---|---|---|---|
| 5,987,011 A * | 11/1999 | Toh | 370/331 |
| 6,928,061 B1 * | 8/2005 | Garcia-Luna-Aceves et al. | 370/329 |
| 2002/0013856 A1 * | 1/2002 | Garcia-Luna-Aceves et al. | 709/238 |
| 2002/0075873 A1 * | 6/2002 | Lindhorst-Ko et al. | 370/394 |
| 2005/0089005 A1 * | 4/2005 | Sakoda et al. | 370/348 |
| 2007/0104199 A1 * | 5/2007 | Taha | 370/392 |
| 2008/0186907 A1 * | 8/2008 | Yagyuu et al. | 370/328 |

FOREIGN PATENT DOCUMENTS

| | | |
|---|---|---|
| KR | 10-2011-0131754 A | 12/2011 |
| KR | 10-2012-0011224 A | 2/2012 |
| KR | 10-2012-0030015 A | 3/2012 |

OTHER PUBLICATIONS

Bongsoo Kim et al., "A Study on the multi-hop routing in session-based wireless communication nodes", KICS, Jun. 20-22, 2012, pp. 769-770, vol. 48.

* cited by examiner

*Primary Examiner* — Brian Roberts
(74) *Attorney, Agent, or Firm* — Rabin & Berdo, P.C.

(57) ABSTRACT

Provided is a session-based broadcasting method that may transmit a message packet from a source node to a plurality of destination nodes out of a radio coverage, in a wireless network including a plurality of sensor nodes and active radio frequency identification (RFID) devices, and more particularly, an apparatus and method for multi-hop routing decision and looping prevention that may (1) determine a scope of multi-hop routing for receiving a response packet from a destination node within a predetermined session open duration, and (2) prevent a looping phenomenon in which nodes continuously receive and re-transmit message packets, due to a characteristic of a broadcasting communication scheme through which all users may receive message packets.

8 Claims, 4 Drawing Sheets

APPARATUS AND METHOD FOR MULTI-HOP ROUTING DECISION AND LOOPING PREVENTION

CROSS-REFERENCE TO RELATED APPLICATION

This application claims the benefit of Korean Patent Application No. 10-2012-0068843, filed on Jun. 27, 2012, in the Korean Intellectual Property Office, the disclosure of which is incorporated herein by reference.

BACKGROUND

1. Field of the Invention

The present invention relates to a session-based broadcasting method that may transmit a message packet from a source node to a plurality of destination nodes out of a radio coverage, in a wireless network including a plurality of sensor nodes and active radio frequency identification (RFID) devices, and more particularly, to an apparatus and method for multi-hop routing decision and looping prevention that may (1) determine a scope of multi-hop routing for receiving a response packet from a destination node within a predetermined session open duration, and (2) prevent a looping phenomenon in which nodes continuously receive and re-transmit message packets, due to a characteristic of a broadcasting communication scheme through which all users may receive message packets.

2. Description of the Related Art

In communication over a wireless network including a plurality of wireless nodes, for example, sensor nodes and active radio frequency identifications (RFIDs), mutual radio frequency interference, and repeated transmission and reception of identical messages, referred to as a looping phenomenon, may occur. In particular, when multi-hop communication is performed by a broadcasting communication scheme, such phenomena may occur more frequently.

In the multi-hop communication performed by the broadcasting communication scheme, various paths from a source node to a distant destination node may exist, and the looping phenomenon in which a transmitted message packet is transmitted and received repeatedly from a receiver to a transmitter may occur frequently.

In a session-based communication system, a session open duration may be predetermined, and communication between nodes may be available only for the session open duration. When the session open duration elapses, packets received after a session is closed may be discarded. Accordingly, a last destination node receiving a message packet, by multi-hop routing, from a first source node transmitting the message packet should send a response within the session open duration. In addition, a transfer of a message packet using multi-hop routing to a destination node incapable of sending a response within the session open duration may be inconsequential.

In addition, everyone may receive a message packet, and broadcast the received message packet again, because all nodes in the wireless network including the source node and the destination nodes may communicate using the broadcasting communication scheme. In this instance, all of the nodes in the wireless network may receive a number of identical message packets.

Accordingly, there is a need for a method that may perform multi-hop routing to a destination node capable of sending a response within a session open duration in a wireless network in which the aforementioned phenomena occur, and prevent repeated reception and transmission of identical message packets.

SUMMARY

An aspect of the present invention provides an apparatus and method for multi-hop routing decision and looping prevention that may determine a scope of multi-hop routing by a session-based broadcasting communication scheme, by performing the multi-hop routing to a destination node capable of sensing a response within a session open duration, rather than performing the multi-hop routing indefinitely with respect to a message packet broadcast by a source node since response message packets transmitted from destination nodes to the source node within the session open duration may be received by the source node when communication is performed using the multi-hop routing by the session-based broadcasting communication scheme from the source node to a destination node out of a radio coverage in a wireless network.

Another aspect of the present invention also provides an apparatus and method for multi-hop routing decision and looping prevention that may incorporate a sequence pattern of a specific bit in a system area of a message packet when the message packet is generated by a source node using a broadcasting communication scheme, and transmit the generated message packet. Here, the sequence pattern of the specific bit may be changed each time the message packet is transmitted. When the message packet is received by a reception node by multi-hop routing, the apparatus and method may compare the sequence pattern of the received message packet to a previous sequence pattern. When the sequence patterns are identical, the apparatus and method may discard the received message packet since the corresponding message is previously received. Accordingly, the apparatus and method may remove a looping phenomenon in which a node transmitting a message packet using a broadcasting communication scheme and another node receiving the message packet continuously re-transmits the message packet.

According to an aspect of the present invention, there is provided an apparatus for multi-hop routing decision and looping prevention, the apparatus including a transmitting unit of a source node to transmit a message packet including a sequence pattern to a destination node within a session open duration, and a routing unit of the destination node to receive the message packet, and route the received message packet repeatedly when the sequence pattern included in the received message packet differs from a previous sequence pattern.

According to another aspect of the present invention, there is also provided a method for multi-hop routing decision and looping prevention, the method including transmitting, by a source node, a message packet including a sequence pattern to a destination node within a session open duration, and receiving, by the destination node, the message packet, and routing the received message packet repeatedly when the sequence pattern included in the received message packet differs from a previous sequence pattern.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

For ease of description with respect to an apparatus and method for multi-hop routing decision and looping prevention according to an embodiment of the present invention, terms used herein are defined as follows.

The term "source node" refers to a communication node that may attempt to perform communication for transmitting a message packet to a destination node, and may include, for example, a sensor node, an active radio frequency identification (RFID) using a radio signal, and the like.

The term "destination node" refers to a final node to which a message packet may be transmitted from a source node through communication for transmitting and receiving message packets, and may include, for example, an RFID using a radio signal, and the like.

The term "session" refers to a time period starting from a time at which processes are identified by exchanging messages to perform communication between the processes of a communication layer included in a node to a time at which the communication is terminated.

The term "broadcasting" refers to sending information from a node to a plurality of nodes, simultaneously. The term "broadcast message" refers to a message transmitted voluntarily to all nodes on a multipoint line.

The term "looping phenomenon" refers to a phenomenon in which a process of a transmitting apparatus transmitting a single message and an apparatus receiving the message re-transmits the identical message to the transmitting apparatus is repeated.

The term "RFID" refers to a technology for identifying information using radio waves in a short distance between an RFID tag and a reader.

The term "active RFID" refers to an RFID using power of a tag for reading information in a chip and performing communication using the information.

According to an embodiment of the present invention, message transmission may be performed using session-based broadcasting communication from a single wireless node, for example, a source node, to another wireless node, for example, a destination node, outside a range of a radio coverage in a wireless network including a plurality of wireless nodes. A wireless node may act as a medium for communication for other adjacent wireless nodes when wireless communication is performed. In addition, the wireless node may re-transmit a received message packet to another wireless node using a broadcasting communication scheme, and perform actions associated with contents of the received message packet. A session-based communication node may receive a packet for a session open duration set when a session is configured. When the session open duration elapses, the session may be closed and a message packet transmitted by another node may not be received.

In general, a multi-hop routing process from a source node to a destination node using a session-based broadcasting communication scheme may be performed as follows.

① The source node may configure a message using an address of the source node and contents to be transferred, set a session open duration, and open a session. The source node may communicate using a broadcasting communication scheme and thus, may output a message packet using a radio frequency (RF) through a wireless communication module, without including an address of a destination node in the message packet. When the session open duration elapses, the session may be closed and a message packet may not be received. Accordingly, destination nodes should send responses within the session open duration.

② The message packet output by the source node using the RF may be received by a wireless communication reception module of another neighboring wireless node, and the other wireless node may interpret the message packet and perform an action to be performed by the other neighboring wireless node. In addition, the other wireless node may configure a message packet identical to the received message packet, and re-output the configured message packet using a wireless communication module of the other wireless node using a broadcasting communication scheme.

③ The process of ② may be repeated.

④ When the message packet is transferred to all destination nodes by performing the processes of ② and ③, a destination node may interpret contents of the corresponding message packet and perform an action corresponding to the contents.

According to embodiments of the present invention, in transmitting a message packet from a source node through a plurality of nodes to a final destination node using a broadcasting communication scheme, a method of transferring a message packet, using multi-hop routing, from a source node to a destination node in a range in which a response may be received within a predetermined session open duration, and a method of resolving a looping phenomenon in which a number of identical message packets may be received since all nodes may broadcast identical message packets repeatedly due to a broadcasting communication scheme will be described.

① A session open duration, for example, Time of Session Open Duration ($T_{SOD}$), corresponding to a time period within which a response from a destination node $N_B$ may be desired to be received in order for a source node $N_A$ to transmit a message packet by a broadcasting communication scheme may be determined.

② A maximum number of times multi-hop routing is to be performed, for example, MAX_HOP_COUNTER, may be determined in order to perform the multi-hop routing from the source node $N_A$ to the destination node $N_B$.

③ The source node $N_A$ may generate an n-bit sequence pattern to prevent a looping phenomenon caused by nodes in a wireless network when the multi-hop routing is performed by the broadcasting communication scheme. When the n-bit sequence pattern is configured in a message from a user, a node receiving the message may interpret the message from the user and thus, message transfer performance may decrease. Accordingly, the sequence pattern may be set in an internal system area within the message packet, rather than in the message from the user. In addition, different sequence patterns should be generated each time a message packet is generated. A reception node may store a sequence pattern of a previously received message packet, and determine whether the repeated message packet is received, by comparing sequence patterns when a current message packet is received.

④ When the session open duration $T_{SOD}$, message contents, the maximum number of times the multi-hop routing is to be performed, and the sequence pattern are determined by the source node $N_A$, the message packet may be transmitted using an RF based on the broadcasting communication scheme.

⑤ When the message packet is received by the broadcasting communication scheme, the node $N_B$ receiving the message packet transmitted by the source node NA may extract a sequence pattern, for example, Sequence_Pattern, to determine whether the received message packet corresponds to the previously received message packet. When the sequence pattern of the received message packet is identical to a sequence pattern, for example, p_Sequence_Pattern, of the previous message packet stored in the node $N_B$, the node NB may discard the received message packet since the repeated message is received.

⑥ When the received message packet does not correspond to the message packet received repeatedly, the node $N_B$ may extract the session open duration from the received message packet, and verify whether the node $N_B$ is positioned in a distance in which the message packet may be copied and transmitted within a response-receivable duration. When a subsequent node $N_C$ is unable to send a response to the source node $N_A$ within the session open duration, a further message packet may not be routed to the subsequent node $N_C$.

⑦ When an amount of time is sufficient for the subsequent node $N_C$ to receive the message packet and send a response, the node $N_B$ may reduce the maximum number of times the multi-hop routing is to be performed by "1" in the received message packet, configure an identical message packet using the received sequence pattern and the received message contents, and re-transmit the configured message packet by the broadcasting communication scheme.

The processes of ⑤ through ⑦ may be performed by all wireless nodes in the wireless network, and as a result of the performing, a scope of the multi-hop routing with respect to the message packet transferred by multi-hop routing using the broadcasting communication scheme may be restricted. A looping phenomenon of the message packet may be prevented by restricting retransmission of identical message packets. Accordingly, performance of a wireless system may be improved, an energy resource held by wireless nodes may be saved, a lifespan of the nodes in the wireless network may be extended, and consequently, a lifespan of the wireless sensor network, as a whole, may be extended.

Based on the description provided above, an apparatus and method for multi-hop routing decision and looping prevention according to an embodiment of the present invention will be described in detail with reference to the accompanying drawings.

Figure 1:
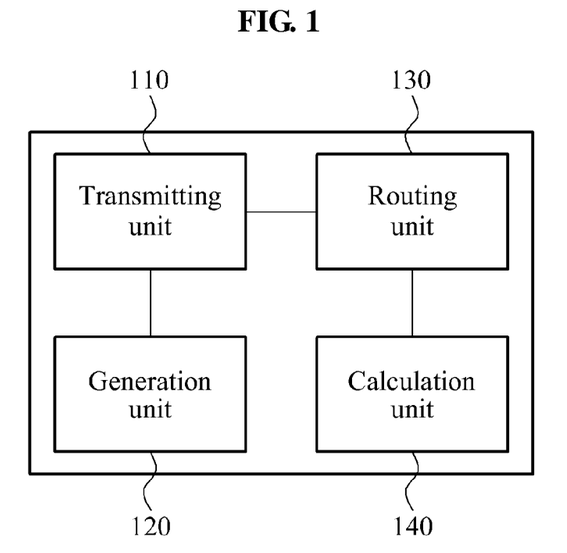
FIG. 1 is a block diagram illustrating a configuration of an apparatus for multi-hop routing decision and looping prevention according to an embodiment of the present invention.

FIG. 1 is a block diagram illustrating a configuration of an apparatus for multi-hop routing decision and looping prevention according to an embodiment of the present invention.

Referring to FIG. 1, the apparatus for multi-hop routing decision and looping prevention, hereinafter referred to as the "apparatus", may include a transmitting unit 110, a generation unit 120, a routing unit 130, and a calculation unit 140.

The transmitting unit 110 may transmit a message packet from a source node to a destination node within a session open duration. The transmitting unit 110 may determine the session open duration, and a maximum number of times multi-hop routing is to be performed, and broadcast the message packet including the session open duration, the maximum number of times the multi-hop routing is to be performed, and a sequence pattern.

The generation unit 120 may set the sequence pattern in an internal system area, and generate a different pattern each time the sequence pattern is generated.

The routing unit 130 may receive a message packet via a communication channel, and route the received message packet repeatedly. The routing unit 130 may extract a sequence pattern from the received message packet, determine whether the extracted sequence pattern is identical to a previous sequence pattern, extract a session open duration from the message packet when the extracted sequence pattern differs from the previous sequence pattern, and reduce a maximum number of times multi-hop routing is to be performed and broadcast the sequence pattern when a response-receivable duration is less than the session open duration.

The calculation unit 140 may calculate a response-receivable duration with respect to the message packet. The calculation unit 140 may calculate an amount of time required for processing a message packet and an amount of time to be expended for sending a response from a destination node to a source node, by doubling a value obtained by multiplying a number of nodes by the amount of time required for processing the message packet, and calculate a response-receivable duration required until the message packet arrives at the source node, by adding the amount of time required for processing the message packet to the amount of time expended for sending a response from the node to the source node.

Figure 2:
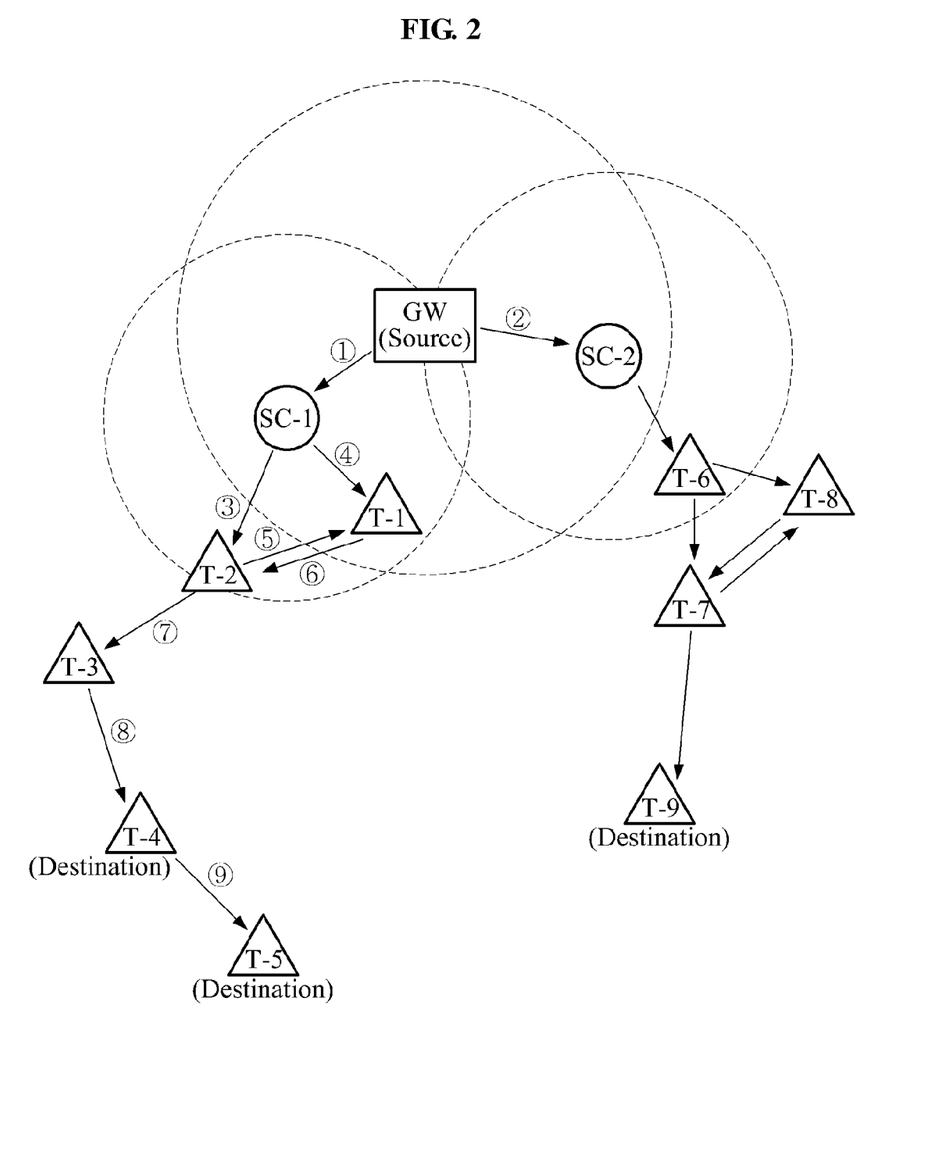
FIG. 2 is a diagram illustrating a process of transferring a message packet from a source node to another node in a wireless network by multi-hop routing using a broadcasting communication scheme according to an embodiment of the present invention.

FIG. 2 is a diagram illustrating a process of transferring a message packet from a source node to another node in a wireless network by multi-hop routing using a broadcasting communication scheme according to an embodiment of the present invention.

In FIG. 2, paths of wireless communication using a broadcasting communication scheme from a source node, for example, a gateway (GW), to other destination nodes, for example, sub-controllers (SC-n), and tags (T-n), in a wireless network are illustrated. The source node may perform one-step communication with nodes, for example, SC-1, SC-2, and T-1, within a radio coverage of the source node. Nodes, for example, T-2 through T-9, out of the radio coverage, for example, an RF range of the source node, may receive the message packet of the source node from the nodes, for example, SC-1, SC-2, and T-1, having received the message packet from the source node, by the multi-hop routing scheme.

In this instance, a destination node T-5 farthest from the source node may receive the message packet by the multi-hop routing using the broadcasting communication scheme. However, when the destination node T-5 is unable to send a response to the source node within a session open duration of the source node, the multi-hop routing from a node T-4 to the node T-5 may be inconsequential. Accordingly, the node T-4 may calculate a response processing time. When the node T-5 is positioned within a range in which a response may be sent to the source node within the session open duration of the source node, the node T-4 may transmit the message packet to the node T-5. However, when the node T-5 is unable to send a response to the source node within the session open duration of the source node, the node T-4 may not perform the multi-hop routing any further.

In addition, the node T-1 and the node T-2 may receive the identical message packet from the node SC-1, by the broadcasting communication scheme, and may transmit the message packet by the broadcasting communication scheme, respectively. In this instance, the identical message packets may be continuously transmitted and received from the node T-1 to the node T-2, and from the node T-2 to the node T-1, whereby a looping phenomenon may occur. In order to prevent such a looping phenomenon, the source node may incorporate an n-bit sequence pattern into an internal system area within the message packet when configuring the message packet, and transmit the configured message packet including the n-bit sequence pattern. Here, the n-bit sequence pattern may be changed each time the sequence pattern is transmitted. In this instance, the node T-2 may receive the message packet from the node SC-1, and have the corresponding sequence pattern. Accordingly, when the node T-1 transmits the message packet to the node T-2, the node T-2 may extract a sequence pattern from the message packet received from the node T-1, and compare the extracted sequence pattern to the previously received sequence pattern. Since the extracted sequence pattern is identical to the previously received sequence pattern, the node T-2 may not re-broadcast the corresponding message packet, and discard the message packet. In a similar manner, the node T-1 may discard the message packet received from the node T-2, thereby the looping phenomenon may be prevented.

Figure 3:
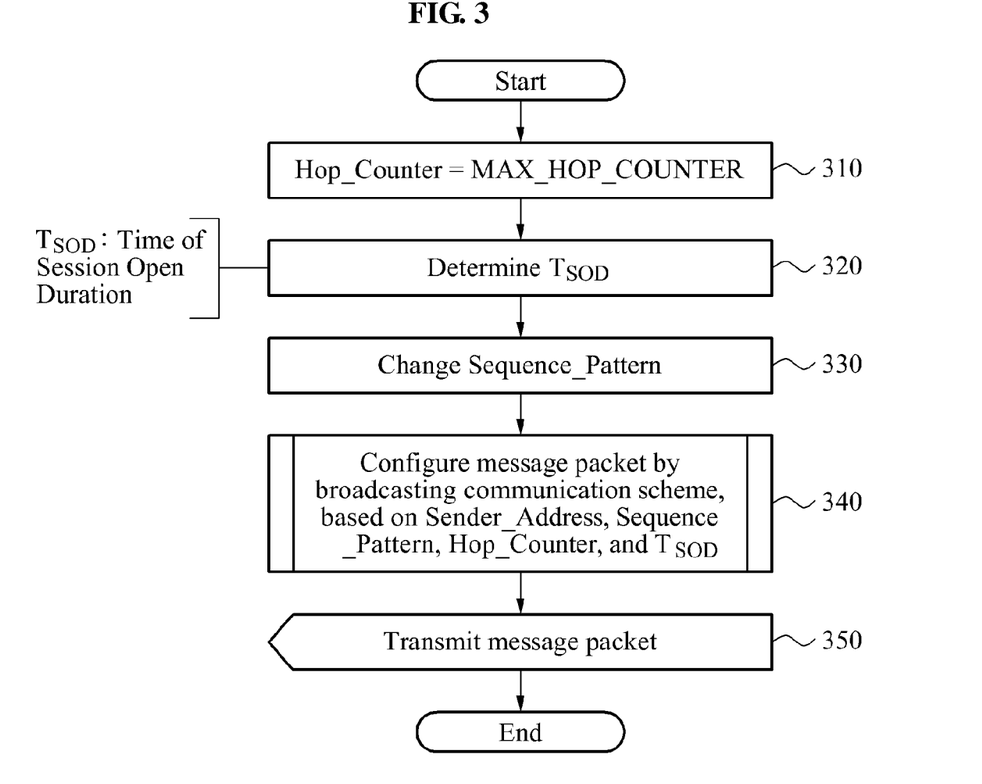
FIG. 3 is a flowchart illustrating a process of generating a message packet for transferring data from a source node, for example, a gateway (GW), to a destination node according to an embodiment of the present invention.

FIG. 3 is a flowchart illustrating a process of generating a message packet for transferring data from a source node, for example, a GW, to a destination node according to an embodiment of the present invention.

Generation and Transmission of Message Packet (1) In operation 310, a number of hops, for example, MAX_HOP_COUNTER, with which a message packet generated by a source node may be routed to the maximum may be set in a hop counter, for example, Hop_Counter. Each time the message packet passes one node, the hop counter may be reduced by "1". When the hop counter corresponds to "0", the routing may not be performed any further.

(2) In operation 320, the source node may determine a session open duration, for example, $T_{SOD}$. When the session open duration elapses, the session may be closed, and all packets transmitted to the source node after the lapse of the session duration may not be received by the source node. Accordingly, all nodes desiring to transmit packets to the source node should send response packets to the source node within the session open duration.

(3) In operation 330, in order to prevent a looping phenomenon occurring among nodes receiving the message packet when the source node transmits the message packet to all of the nodes in a wireless network by a broadcasting communication scheme, the source node may generate a specific n-bit sequence pattern, record the sequence pattern in an internal system area, rather than a user portion of a message, and transmit the message packet. The sequence pattern may be changed each time the message packet is generated by the source node.

(4) In operation 340, the source node may configure the message packet using the parameters prepared through the processes of (1) through (3) and a message from the user, by the broadcasting communication scheme.

(5) In operation 350, the source node may transmit the message packet configured in the process of (4) to the other nodes in the wireless network.

Figure 4:
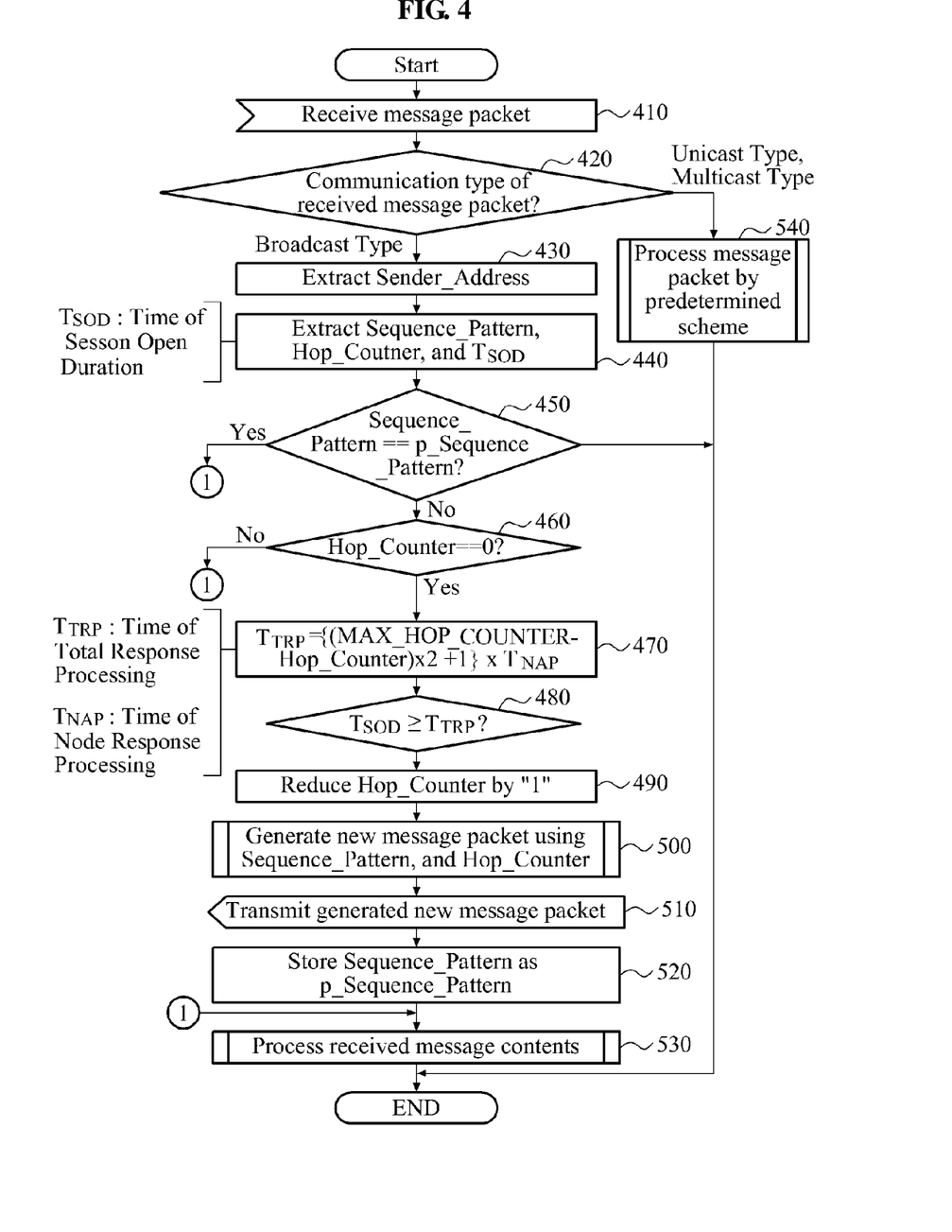
FIG. 4 is a flowchart illustrating a process of a destination node receiving a message packet transmitted from a source node in a wireless network, and determining whether the received message packet is to be routed and whether the received message packet is identical to a previously received message packet according to an embodiment of the present invention.

FIG. 4 is a flowchart illustrating a process of a destination node receiving a message packet transmitted from a source node in a wireless network, and determining whether the received message packet is to be routed and whether the received message packet is identical to a previously received message packet according to an embodiment of the present invention.

The destination node in the wireless network may perform the following operations.

(1) In operation 410, the destination node may receive a message packet from the source node.

(2) In operation 420, the received packet may be processed differently based on a communication type by which the message packet is transmitted. The communication type may include a unicasting communication type, a multicasting communication type, and a broadcasting communication type. Herein, the broadcasting communication type may be applied.

(3) In operation 430, the destination node may extract a source address, for example, Sender_Address, from the received message packet. The extracted source address may be used for sending a response to the source node.

(4) In operation 440, the destination node may extract a sequence pattern, for example, Sequence_Pattern, a hop counter, for example, Hop_Counter, and a session open duration, for example, $T_{SOD}$, from the received message packet.

(5) When the message packet is received from the source node, the destination node in the wireless network may compare the extracted sequence pattern to a previous sequence pattern, for example, p_Sequence_Pattern, recorded and stored in the destination node to verify whether the extracted sequence pattern is identical to the previous sequence pattern, in operation 450. When the extracted sequence pattern is identical to the previous sequence pattern, the received message packet may correspond to the message packet previously received by the destination node and thus, may be discarded. However, when the extracted sequence pattern differs from the previous sequence pattern, the received message packet may correspond to a new message packet transmitted from the source node and thus, the received message packet may be continuously processed.

(6) In operation 460, the destination node may verify whether the hop counter extracted from the received message packet corresponds to "0". When the hop counter corresponds to "0", the message packet received by the destination node may be transmitted through all of a maximum number of hops for routing designated by the source node. Accordingly, message contents may be processed without any further routing being performed. However, when the hop counter does not correspond to "0", further routing may be performed and thus, a subsequent operation for the routing may be performed.

(7) In 470, the destination node may calculate an amount of time expended for transmitting the message packet, and an amount of time required for sending a response message packet to the source node, for example, Time of Total Response Processing ($T_{TRP}$), based on a maximum number of hops for routing determined by the source node, the extracted hop counter, and an amount of time required for processing the message packet received by each node, for example, Time of Node Response Processing ($T_{NRP}$). A number of nodes through which the message packet is transmitted may be calculated by subtracting the hop counter from a maximum hop counter, for example, MAX_HOP_COUNTER, and an amount of time to be expended for transmitting the message packet from the source node to the destination node may be calculated by multiplying the calculated number of nodes by the amount of time required for processing the message packet by each node, for example, $T_{NRP}$. By doubling the amount of time to be expended, an amount of time to be expended for sending a response from the destination node to the source node may be calculated. An amount of time to be expended until the response arrives at the source node after the message packet is processed by the destination node, for example, $T_{TRP}$, may be obtained by adding the amount of time required for processing the message packet by the destination node, for example, $T_{NRP}$, to the calculated amount of time to be expended for sending the response from the destination node to the source node.

(8) In operation 480, the destination node may compare the $T_{TRP}$ calculated in the process of (7) to the $T_{SOD}$. Based on a result of the comparing, the destination node may determine whether the message packet is to be routed to a subsequent destination node. When the $T_{TRP}$ is less than or equal to the $T_{SOD}$, the multi-hop routing may be performed such that the subsequent destination node may perform the processing process to receive the message packet of the source node, in operation 490 through 530. However, when the $T_{TRP}$ is greater than the $T_{SOD}$, the destination node may not perform the routing, and process the message contents, in operation 530.

(9) When the $T_{TRP}$ is less than the $T_{SOD}$ in the process of (8), the destination node may reduce the hop counter by "1" to perform the multi-hop routing additionally, in operation 490.

(10) In operation 500, the destination node may generate a new message packet of the broadcasting communication scheme, using the sequence pattern extracted from the message packet received from the source node, the hop counter, and the contents of the received message packet. The sequence pattern extracted from the message packet received from the source node may be used for other destination nodes receiving the new message packet to verify whether the message packet of the source node is previously received through other paths. In addition, when the new message packet is generated, the message contents received from the source node may be used for the other destination nodes to perform an action corresponding to the message contents.

(11) In operation 510, the destination node may transmit the newly generated message packet by the broadcasting communication scheme.

(12) In operation 520, the destination node may store the sequence pattern extracted from the message packet received from the source node, as a previous sequence pattern. In doing so, whether a received message packet corresponds to the previously received message packet or a new message packet may be determined by comparing a sequence pattern of the newly received message packet to the previous sequence pattern, when a message packet is received from another node.

(13) In operation 530, the destination node may process the message contents received from the source node when the transmission of the received message packet from the destination node to another node is performed.

Through the processes described above, the looping phenomenon in which a node may repeatedly receive identical message packets transmitted by the broadcasting communication scheme may be prevented, and the multi-hop routing to nodes capable of sensing responses within a session open duration may be performed only for the session open duration.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer-readable recording mediums.

The method according to the exemplary embodiments of the present invention may be recorded in non-transitory computer-readable media including program instructions to implement various operations embodied by a computer. The media may also include, alone or in combination with the program instructions, data files, data structures, and the like. Examples of the non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to an aspect of the present invention, in transmitting a message packet from a source node to a destination node out of a radio coverage in a wireless network by session-based multi-hop routing using a broadcasting communication scheme, by performing routing to a destination node capable of sending a response within a predetermined session open duration, radio frequency interference and dissipation of radio frequency resources caused by batch retransmission may be reduced, and limited energy resources held by all nodes participating in the multi-hop routing may be saved, whereby a lifespan of the wireless network, as a whole, may be extended.

According to another aspect of the present invention, a source node may incorporate an n-bit sequence pattern in a system area of a message packet, and transmit the message packet for performing multi-hop routing using a broadcasting communication scheme. A destination node receiving the message packet from the source node may extract the sequence pattern from the message packet, and compare the extracted message packet to a previous sequence pattern stored in advance. When the extracted sequence pattern is identical to the previous sequence pattern, the message packet may be discarded since the received message packet corresponds to a message packet previously received. When the extracted sequence pattern differs from the previous sequence pattern, the corresponding message may be received and processed since the received message packet corresponds to another new message packet. Accordingly, it is possible to prevent a looping phenomenon occurring when a sequence pattern is absent, the looping phenomenon in which identical message packets received from the source node may be transmitted and received by nodes repeatedly.

According to still another aspect of the present invention, nodes in a wireless sensor network may prevent radio frequency interference and dissipation of radio frequency resources when broadcasting communication is performed, increase performance by reducing unnecessary processing of the nodes in the wireless network, and perform minimum necessary communication, thereby extending a lifespan of each node holding limited energy and consequently, extending a lifespan of the wireless system, as a whole.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for multi-hop routing decision and looping prevention, the apparatus comprising at least one processing device configured to implement:
a transmitting unit of a source node to transmit a message packet comprising a sequence pattern to a destination node within a session open duration; and
a routing unit of the destination node to receive the message packet, and route the received message packet repeatedly when the sequence pattern included in the received message packet differs from a previous sequence pattern;
a generation unit of the source node to generate the sequence pattern,
wherein the transmitting unit determines a session open duration, and a maximum number of times multi-hop routing is to be performed, and transmits the message packet comprising the sequence pattern, the maximum number of times multi-hop routing is to be performed, and the session open duration.

2. The apparatus of claim 1, wherein the generation unit generates a different sequence pattern each time the sequence pattern is generated, and sets the sequence pattern in an internal system area.

3. The apparatus of claim 1, further comprising:
a calculation unit of the destination node to calculate a response-receivable duration with respect to the message packet,
wherein, when the sequence pattern included in the message packet differs from the previous sequence pattern, the routing unit extracts the session open duration from the message packet, and reduce a maximum number of times multi-hop routing is to be performed and routes the sequence pattern when the calculated response-receivable duration is less than the session open duration.

4. The apparatus of claim 3, wherein the calculation unit calculates an amount of time required for processing the message packet and an amount of time to be expended for sending a response from the destination node to the source node, by multiplying a number of nodes by the amount of time required, and calculates the response-receivable duration, by adding the amount of time required to the amount of time to be expended.

5. A method for multi-hop routing decision and looping prevention, the method comprising:
transmitting, by a source node, a message packet comprising a sequence pattern to a destination node within a session open duration; and
receiving, by the destination node, the message packet, and routing the received message packet repeatedly when the sequence pattern included in the received message packet differs from a previous sequence pattern;
wherein the transmitting comprises:
determining a session open duration;
determining a maximum number of times multi-hop routing is to be performed;
generating the sequence pattern; and
transmitting the message packet comprising the sequence pattern, the maximum number of times multi-hop routing is to be performed, and the session open duration.

6. The method of claim 5, wherein the generating comprises:
generating a different sequence pattern each time the sequence pattern is generated; and
setting the sequence pattern in an internal system area.

7. The method of claim 5, the routing comprises:
when the sequence pattern included in the message packet differs from the previous sequence pattern,
extracting the session open duration from the message packet;
calculating a response-receivable duration with respect to the message packet; and
reducing a maximum number of times multi-hop routing is to be performed and routing the sequence pattern when the calculated response-receivable duration is less than the session open duration.

8. The method of claim 7, wherein the calculating comprises:
calculating an amount of time required for processing the message packet;
calculating an amount of time to be expended for sending a response from the destination node to the source node, by multiplying a number of nodes by the amount of time required; and
calculating the response-receivable duration, by adding the amount of time required to the amount of time to be expended.

* * * * *